United States Patent
Koch

[11] 3,851,971
[45] Dec. 3, 1974

[54] APPARATUS FOR TESTING THE AUTHENTICITY OF PAPER CURRENCY

[75] Inventor: Jurgen Koch, Buxtehude, Germany

[73] Assignee: National Rejectors Inc., GmbH, Buxtehude, Germany

[22] Filed: Nov. 6, 1972

[21] Appl. No.: 304,091

[30] Foreign Application Priority Data
Jan. 29, 1972  Germany............................ 2204284

[52] U.S. Cl.................. 356/71, 250/563, 250/572, 356/168
[51] Int. Cl....................... G06k 9/08, G01b 11/24
[58] Field of Search....................... 356/71, 97, 168; 250/217 R, 217 SS, 219 DG, 563, 572

[56] References Cited
UNITED STATES PATENTS

| 2,847,899 | 8/1958 | Walsh | 356/87 |
|---|---|---|---|
| 2,941,187 | 6/1960 | Simjian | 356/71 |
| 3,419,724 | 12/1968 | Bayha | 356/71 |
| 3,473,067 | 10/1969 | Rittmayer | 250/217 SS |
| 3,480,785 | 11/1969 | Aufderheide | 356/71 |
| 3,495,089 | 2/1970 | Brown | 250/217 R |
| 3,600,091 | 8/1971 | Goleb | 356/87 |
| 3,679,314 | 7/1972 | Mustert | 356/71 |
| 3,711,210 | 1/1973 | Krukowski | 356/207 |
| 3,727,056 | 4/1973 | Enemark | 356/207 |

Primary Examiner—Vincent P. McGraw
Attorney, Agent, or Firm—Beaman & Beaman

[57] ABSTRACT

Apparatus for testing the authenticity of sheet material, comprising an oscillator which is arranged to emit radiation oscillating at a pre-selected frequency, means for conveying the sheet material into the path of the radiation so that the radiation is reflected or refracted from the sheet material to a receiver which is arranged to transmit an output signal only in response to radiation oscillating at the pre-selected frequency, this output signal being sensed by means which selectively generate a stop or pass signal in response to the output signal.

5 Claims, 3 Drawing Figures

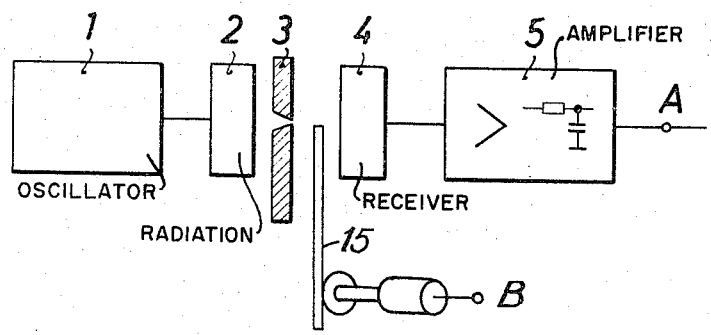
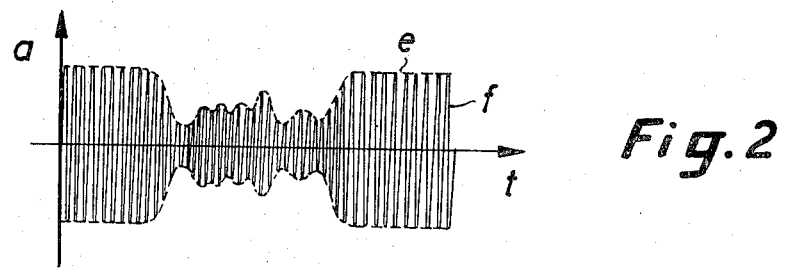
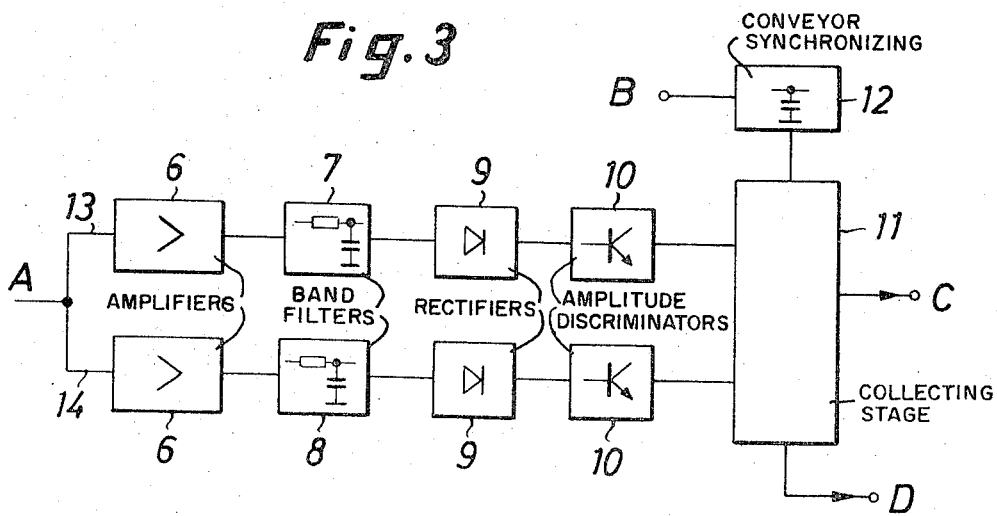

APPARATUS FOR TESTING THE AUTHENTICITY OF PAPER CURRENCY

BACKGROUND OF THE INVENTION

The invention relates to an apparatus for testing the authenticity of sheet material, particularly but not exclusively bank notes, having a source or a number of sources of radiation whose radiation is directed on to the sheet material, a conveyor which conveys the sheet material into the path of the radiation, a receiver which receives the radiation which is reflected or refracted by the sheet material and which generates a test signal corresponding to the permeability or reflecting capacity of the sheet material, and a sensing device into which the test signal is fed and produces a pass or stop signal.

It is known to use optical measuring techniques for testing the authenticity of bank notes. The known technique makes use of a light source radiating light of constant wavelength which, for example, is focussed by a system of lenses on to a bank note which is held by a conveyor and conveyed across the light beam. The respective patterns and colors printed on the bank note result in the intensity of the light which penetrates defined areas of the bank note varying and being thus characteristic for a given bank note. The receiver generates a signal corresponding to the changes in intensity which is fed into a sensing device. The sensing device thereupon evaluates the signal to determine if it corresponds to the characteristic signal of a genuine bank note.

The known apparatus has some important disadvantages. It uses ordinary white incandescent lamps as the light source and these have a relatively short life. Moreover, the light intensity changes with the ageing of the incandescent lamps. This leads to the test apparatuses breaking down easily and results in correspondingly high maintenance costs. In addition a relatively great amount of circuitry is required to compensate for the effects of ageing at the light source. Some of these disadvantages can be avoided if so-called luminescence diodes are used as sources of light. A further disadvantage of the known apparatus is found both with the use of incandescent lamps and that of luminescence diodes and is caused by a stray radiation which can hardly be avoided, for example in consequence of reflection from surfaces and points inside the test apparatus. Stray radiation of this kind influences the quality of the evaluating signal.

SUMMARY OF THE INVENTION

The object of the invention is, therefore, to produce an apparatus for the optical verification of sheet material, particularly bank notes, which is simple to construct and requires little maintenance and which delivers test signals almost free from the effects of interference. In addition, it must afford reliable evaluation even with patterns of varying size, which are found particularly in bank notes.

According to the invention, there is provided apparatus for testing the authenticity of sheet material, comprising an oscillator for emitting radiation oscillating at a pre-set frequency, conveyor means for conveying sheet material to be tested into the path of said radiation, a receiver for receiving radiation transmitted from said sheet material and arranged to transmit an output signal only in response to radiation oscillating at essentially the same frequency as said pre-set frequency and means for sensing said output signal and for generating a stop or pass signal selectively in response to said output signal.

As distinct from the known apparatus, the apparatus in accordance with the invention uses a radiation source which emits oscillating radiation, the frequency of which depends on that of the oscillator or the power source which feeds the radiation source. The oscillating radiation is reflected or refracted by the sheet material and falls on to a receiver which gives out a test signal corresponding to the intensity of the reflected or penetrating radiation. The receiver is tuned to the oscillating frequency of the radiation - not to be confused with the frequency of the electro-magnetic radiation, which is higher by several powers of ten - and therefore only emits the test signal when a radiation having this frequency impinges on it. This affords the advantage that the apparatus in accordance with the invention does not respond to stray radiation. The likelihood of stray radiation of the same oscillating frequency being present is so small that it can be disregarded. A further advantage of the invention is that the oscillating frequency permits working with AC components. With comparable input, greater stability against interference is obtained with such components than is the case when working with DC components as is necessary with known apparatus for testing the authenticity of bank notes.

One embodiment of the invention provides for the receiver to comprise one or more photo-electric elements on which the radiation coming from the sheet material impinges and which generates an AC signal corresponding to the oscillating frequency of the radiation. Semi-conductors which are sensitive to light can, for example, serve as photo-electric elements.

Another embodiment of the invention includes an optical filter placed between the conveyor means and the photo-electrical element, its transmitting range being tuned approximately to the wave-length of the radiation source. The filter heightens the sensitivity of the testing apparatus since only radiation with a frequency range corresponding to the frequency range of the radiation source is accepted. Extraneous light with a wave-length outside this range, even though it may have the same oscillating frequency as the radiation source, is thus suppressed.

The AC signal generated by the photo-electric elements reflects both the test radiation and extraneous light, if present. According to another embodiment of the invention, the receiver device can be tuned by the sensing means having a selective amplifier which receives the AC signal and only amplifies the AC voltage which lies within the range of the oscillating frequency of the radiation. Those AC voltage components of the test signal which correspond to elements of radiation interference are therefore suppressed and have no further effect on the testing.

The output signal from the selective amplifier corresponds to the optical properties of the sheet material under examination, for example a bank note, that is to the actual reflecting or transmitting properties of the irradiated area. In order to establish if the bank note being examined is genuine, an evaluating channel may be connected in series with the selective amplifier into which the output signal from the latter is fed, said evaluating channel comprising a second amplifier, a band filter tuned to a predetermined frequency corresponding to the nature of the material to be examined, and an amplitude discriminator. The second amplifier amplifies the output signal from the selective amplifier and feeds it to the band filter. The band filter only permits the passage of AC voltages with the frequencies which occur when a genuine bank note is under test. The amplitude discriminator only permits the passage of such AC voltage signals whose amplitudes lie within a predetermined range and the height of which is a gauge for the authenticity of the bank note.

For further evaluation of the signal coming from the amplitude discriminator, another embodiment of the invention provides that a collecting stage is connected in series with the evaluation channel, which stores the output signal from the evaluating channel, that the conveyor generates a synchronising signal which is a gauge for the actual location of the sheet material, and that the collecting stage has a coincidence element which switches through the outgoing signal from the evaluating channel at a predetermined magnitude of the synchronising signal. By this means, the signal corresponding to the optical properties of the irradiated surface of the sheet material is brought relatively to the position of the irradiated surface on the sheet material. This ensures that "correct" values appear at the "correct" position of the material to be examined. Only if both conditions synchronise is a signal generated which indicates a positive test.

In another embodiment of the invention several evaluating channels are connected in parallel and the coincidence element switches through the outgoing signals from the evaluating channels simultaneously or in sequence when the synchronising signal reaches a predetermined magnitude. By means of several evaluating channels, portions of the surface of the material under examination can be tested successively, which ensures a more precise and complete examination of the surface to be tested. A simultaneous interrogation of parallel channels increases accuracy in the examination of a portion of the surface of the material.

Another embodiment of the invention provides for the collecting stage to generate the stop signal in proportion to the synchronising signal if no outgoing signal from the evaluating channel is present. The stop signal shows that the material to be tested is not fault free, for example that a bank note is not genuine.

An infra-red emitter may be used as the radiation source. The long range spectrum of electro-magnetic waves with wave-lengths in the order of 0.8 μm is especially suited to the testing apparatus in accordance with the invention because the radiation sources and receiver required by it signify a relatively low input. A gallium arsenide diode may be included in the radiation source.

An especially reliable evaluating arrangement for the test signal is obtained if the collecting stage consists of digital units and the coincidence element possesses one or more AND elements.

Further objects and advantages of the invention will become apparent from the following description and drawings.

BRIEF DESCRIPTION OF THE DRAWINGS

FIG. 1 shows schematically a block diagram of the test apparatus in accordance with the invention;

FIG. 2 shows diagrammatically the light oscillations of varying amplitude of light which has passed through material to be tested; and FIG. 3 shows schematically a sensing means for the circuit of FIG. 1.

DESCRIPTION OF PREFERRED EMBODIMENTS

An oscillator 1 represents a power source for a radiation element 2, for example a gallium arsenide diode (GaAs diode), and activates it at a pre-set frequency. The oscillating beam from radiation element 2 passes through an aperture 3 and impinges on to a bank note (not shown) which by means of a conveyor 15, is moved over the aperture across the beam. It is also, however, possible to move the bank note in front of aperture 3 across the beam. The part of the oscillating beam which passes through the bank note impinges on a receiver 4, which for example contains a number of light sensitive semi-conductor elements. The light sensitive elements are tuned to the wave-length of the beam, e.g. to visible or IR light. A selective amplifier 5 is connected after the receiver 4 and amplifies the AC output signal of receiver 4. Amplifier 5 is so constructed that it only amplifies voltages which are in the range of the oscillator frequency. Output signal A thus returns the oscillating radiation of radiation element 2, modulated by the optical properties of the bank note conveyed past aperture 3. Extraneous radiation, which very likely has a different oscillating frequency than the light of the radiation element and is usually constant, can therefore not influence the outgoing signal of selective amplifier 5.

Bank notes are normally characterised by distinctive patterns on their surfaces. During the passage of the bank note across aperture 3, such a pattern modulates the beam penetrating it which oscillates at a specific frequency. The frequency of the oscillating beam can therefore be said to be the carrier frequency of a carrier signal which is modulated in amplitude by the varying transmission properties of the bank note. An example of this is shown in FIG. 2 which shows a time diagram of the oscillations of the radiation. In the diagram the amplitude $a$ is shown on the ordinate and the time $t$ on the abscissa. The AC oscillations of radiation element 2 are denoted by $f$. Depending on the permeability of the surface elements of the bank note a varying amplitude and thus intensity of the radiation received by the receiver 4 results. The behaviour of the amplitude, reflected by envelope $e$, is therefore characteristic for specific optical properties of the bank note examined. These optical properties must correspond with a given characteristic shown by a genuine bank note.

FIG. 3 shows an example of an arrangement for an evaluation of the outgoing signal A from the selective amplifier 5. Signal A is led to two parallel evaluating channels 13 and 14. Each channel comprises an amplifier 6, band filter 7 or 8, rectifier 9 and amplitude discriminator 10. Amplifiers 6 amplify signal A still further and feed it into band filters 7 and 8 which are designed so as to filter the frequency corresponding to the pattern on the surface of a bank note. The outgoing signal from band filters 7, 8 which has been rectified in rectifiers 9 arrives at the amplitude discriminators which only let through rectified signals within a defined amplitude range. The amplitude range prescribed by amplitude discriminators 10 is again characteristic of the authenticity of a bank note. The outgoing signal from the amplitude discriminators reaches a collecting stage 11 which records the evaluating signals of evaluating channels 13 and 14. The pass signal then appears at a terminal C. However, before the pass signal can appear at terminal C a second condition must be fulfilled; this is accomplished by a synchronising signal from the conveyor 15 which is fed to terminal B. The synchronising signal is a gauge for the actual position of the bank note at aperture 3. The synchronising signal is converted in stage 12 so that, together with the evaluating signals, it can be passed to a coincidence element (not shown). Therefore, a pass signal only reaches terminal C if the right pattern appears at the right place. If this does not happen, a stop signal appears at terminal D of the collecting stage. The synchronising signal can further be used to check the dimensions of the bank note. The circuit needed for this is, however, not shown here.

The evaluating signals from evaluating channels 13 and 14 can be employed either simultaneously or sequentially for application to the testing of the authenticity of the bank note. Since not only black and white contrasts but also colours are decisive for the transmission properties of the bank note, envelope e (FIG. 2) reproduces the sum of two influencing factors, namely absorption properties of the paper and the printed colours and pattern.

Instead of an aperture 3, an optical focussing system can be used to irradiate specific areas of the bank note, for example a system of lenses.

What is claimed is:

1. Apparatus for testing the authenticity of paper currency comprising, in combination, an oscillator emitting a radiation oscillating at a predetermined frequency, conveyor means conveying paper currency to be tested across the path of said radiation, said conveyor means generating a synchronizing signal for indicating the location of paper currency conveyed by said conveyor means, a receiver receiving radiation transmitted from said paper currency sensing the received radiation and producing an output signal determined only by the radiation received oscillating at substantially the same frequency as said predetermined frequency, said receiver comprising photoelectric means generating an AC output signal corresponding to the oscillating frequency of said radiation, an optical filter for transmitting radiation of essentially the same wave length as radiation emitted by said oscillator located between said conveyor means and said photoelectric means, sensing means sensing said output signal selectively generating an accept or reject signal as determined by said output signal, said sensing means including an amplifier amplifying selectively only AC voltages which lie within the range of the oscillating frequency of said radiation, an evaluating channel comprising a second amplifier, a band filter tuned to a preselected frequency and an amplitude discriminator in series with said first mentioned amplifier for receiving the output signal of said amplifier, a collecting stage in series with said evaluating channel for receiving the output signal from said evaluating channel, and means at said collecting stage for switching through said output signal from said evaluating channel at a preselected value of said synchronizing signal produced by said conveyor means.

2. Apparatus as in claim 1, in which several evaluating channels are provided connected in parallel and said switching means is arranged to switch through the output signals from said evaluating channels simultaneously or sequentially.

3. Apparatus as in claim 1, in which an aperture is arranged to focus said radiation onto paper currency conveyed by said conveyor means.

4. Apparatus as in claim 1, in which an infrared emitter is used as said oscillator.

5. Apparatus as in claim 1, in which a gallium arsenide diode is included in said oscillator.

* * * * *